(12) United States Patent
Wakimoto et al.

(10) Patent No.: US 10,411,244 B2
(45) Date of Patent: Sep. 10, 2019

(54) SECONDARY BATTERY AND ASSEMBLED BATTERY

(71) Applicant: Sanyo Electric Co., Ltd., Daito-shi, Osaka (JP)

(72) Inventors: Ryoichi Wakimoto, Hyogo (JP); Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 96 days.

(21) Appl. No.: 15/431,185

(22) Filed: Feb. 13, 2017

(65) Prior Publication Data

US 2017/0250394 A1 Aug. 31, 2017

(30) Foreign Application Priority Data

Feb. 29, 2016 (JP) ................................ 2016-037888

(51) Int. Cl.
*H01M 2/34* (2006.01)
*H01M 2/30* (2006.01)

(52) U.S. Cl.
CPC ............. *H01M 2/348* (2013.01); *H01M 2/30* (2013.01); *H01M 2/345* (2013.01); *H01M 2200/103* (2013.01); *H01M 2200/20* (2013.01)

(58) Field of Classification Search
None
See application file for complete search history.

(56) References Cited

U.S. PATENT DOCUMENTS

| | | | | |
|---|---|---|---|---|
| 2011/0300419 | A1* | 12/2011 | Byun | H01M 2/22 429/61 |
| 2013/0196179 | A1* | 8/2013 | Han | H01M 2/04 429/7 |
| 2013/0330581 | A1* | 12/2013 | Kim | H01M 2/345 429/61 |
| 2014/0315054 | A1* | 10/2014 | Han | H01M 2/26 429/61 |
| 2014/0377601 | A1 | 12/2014 | Kim | |
| 2015/0207131 | A1* | 7/2015 | Han | H01M 2/345 429/61 |

FOREIGN PATENT DOCUMENTS

JP 2012-123946 A 6/2012
JP 2015-5492 A 1/2015

* cited by examiner

*Primary Examiner* — Alix E Eggerding
(74) *Attorney, Agent, or Firm* — Westerman, Hattori, Daniels & Adrian, LLP

(57) ABSTRACT

A secondary battery includes an electrode body including a positive-electrode sheet and a negative-electrode sheet, an exterior body having an opening and accommodating the electrode body, a sealing body sealing the opening, a terminal electrically connected to the positive-electrode sheet and extending through a through-hole formed in the sealing body, and a conductive member connected to the terminal outside the sealing body. The conductive member includes a fuse. The fuse is covered by a cover. An insulating member is disposed between the conductive member including the fuse and the sealing body.

18 Claims, 7 Drawing Sheets

SECONDARY BATTERY AND ASSEMBLED BATTERY

CROSS REFERENCE TO RELATED APPLICATIONS

The present invention application claims priority to Japanese Patent Application No. 2016-037888 filed in the Japan Patent Office on Feb. 29, 2016, the entire contents of which are incorporated herein by reference.

BACKGROUND OF THE INVENTION

Field of the Invention

The present invention relates to a secondary battery including a fuse for blocking a current path when an excessive short-circuit current flows through the battery and an assembled battery including a plurality of the secondary batteries.

Description of Related Art

When a short circuit occurs between a positive electrode and negative electrode of a secondary battery for some reason, an excessive short-circuit current flows through the secondary battery. A secondary battery that includes a fuse for blocking a current path on the assumption of such a case is known.

Japanese Published Unexamined Patent Application No. 2015-5492 (Patent Document 1) discloses a secondary battery including a fuse disposed outside an exterior body accommodating an electrode body formed of a positive electrode and a negative electrode.

FIG. 10 is a sectional view of part of a fuse disclosed in Patent Document 1. An opening of an exterior body 101 is sealed by a sealing body 102. An external terminal 104 is formed through the sealing body 102 and connected to an electrode sheet with a current collector 103 interposed therebetween. A plate 105 is formed on a surface of the sealing body 102 so as to be joined to the external terminal 104. A thin fuse 106 is formed in part of the plate 105.

When a short circuit occurs in the secondary battery and an excessive short-circuit current flows through the secondary battery, the fuse 106 melts due to Joule heat, blocking the current path.

BRIEF SUMMARY OF THE INVENTION

It is a main object of the present invention to provide a secondary battery that includes a fuse outside an exterior body accommodating an electrode body and that enables an improvement in the reliability of the secondary battery.

A secondary battery according to an embodiment of the present invention includes an electrode body including a positive-electrode sheet and a negative-electrode sheet, an exterior body having an opening and accommodating the electrode body, a sealing body sealing the opening, a terminal connected to the positive-electrode sheet or the negative-electrode sheet and extending through a through-hole formed in the sealing body, and a conductive member connected to the terminal outside the sealing body. The conductive member includes a fuse. The fuse is covered by a cover. An insulating member is disposed between the conductive member and the sealing body.

According to the present invention, a secondary battery that includes the fuse outside the exterior body accommodating the electrode body and that enables an improvement in the reliability of the secondary battery can be provided.

DETAILED DESCRIPTION OF THE INVENTION

An embodiment of the present invention will hereinafter be described in detail with reference to the drawings. The present invention is not limited to the following embodiment. Any modification can be made without departing from a range in which the effect of the present invention is exerted.

Figure 1A:
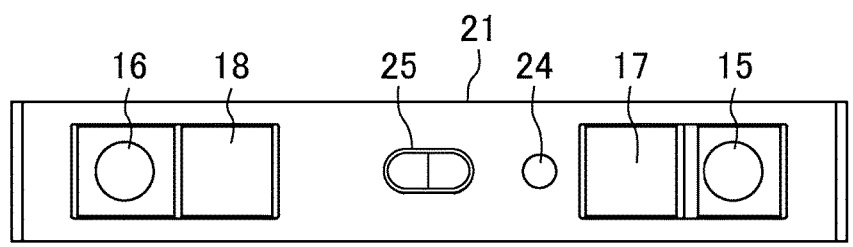
FIG. 1A is a schematic top view of a secondary battery of an embodiment of the present invention.
Figure 1B:
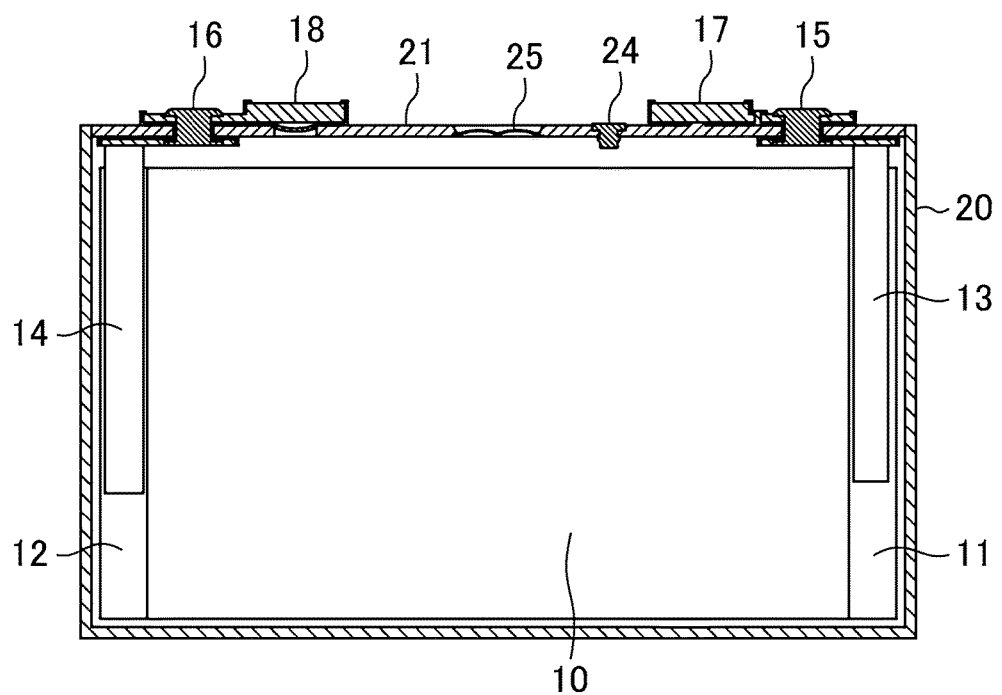
FIG. 1B is a schematic sectional view of the secondary battery.

FIG. 1A and FIG. 1B schematically illustrate a secondary battery according to the embodiment of the present invention. FIG. 1A is a top view of the secondary battery. FIG. 1B is a sectional view of the secondary battery.

As illustrated in FIG. 1A and FIG. 1B, in a secondary battery 1 according to the embodiment, an electrode body 10, which is a power generation component, and an electrolytic solution are accommodated in an exterior body 20. The electrode body 10 is formed in a manner in which a positive-electrode sheet and a negative-electrode sheet are wound or stacked with a separator (these are not illustrated) interposed therebetween. The positive-electrode sheet may be obtained in a manner in which a positive electrode active material layer containing a positive electrode active material is formed on a surface of a metallic positive electrode core.

The negative-electrode sheet may be obtained in a manner in which a negative electrode active material layer containing a negative electrode active material is formed on a surface of a metallic negative electrode core. The positive-electrode sheet includes an exposed positive-electrode core portion 11, at which no active material layer is formed, on one side of the positive-electrode sheet. The negative-electrode sheet includes an exposed negative-electrode core portion 12, at which no active material layer is formed, on one side of the negative-electrode sheet. The positive-electrode sheet and the negative-electrode sheet are disposed such that the exposed positive-electrode core portion 11 extends on the side opposite to the side on which the exposed negative-electrode core portion 12 extends. The exposed positive-electrode core portion 11 is connected to a positive terminal 15 with a positive-electrode current collector 13 interposed therebetween. The exposed negative-electrode core portion 12 is connected to a negative terminal 16 with a negative-electrode current collector 14 interposed therebetween. The positive terminal 15 and the negative terminal 16 are secured to a sealing body 21 so as to extend through respective through-holes formed in the sealing body 21. A positive-electrode conductive member 17 is connected to the positive terminal 15 outside the sealing body 21. A negative-electrode conductive member 18 is connected to the negative terminal 16 outside the sealing body 21. A solution injecting hole through which an electrolytic solution is injected is formed in the sealing body 21. The solution injecting hole is sealed by a sealing member 24 after the electrolytic solution is injected. The sealing body 21 includes an exhaust valve 25 that breaks and causes the pressure in the exterior body 20 to be released when the pressure increases.

In the case where the secondary battery 1 is a non-aqueous electrolyte secondary battery, the positive electrode core, the positive-electrode current collector 13, and the positive terminal 15 are preferably made of aluminum or an aluminum alloy. The negative electrode core, the negative-electrode current collector 14, and the negative terminal 16 are preferably made of copper or a copper alloy.

The exterior body 20 and the sealing body 21 are preferably made of a metal, such as aluminum, an aluminum alloy, stainless steel, or iron.

Figure 2A:
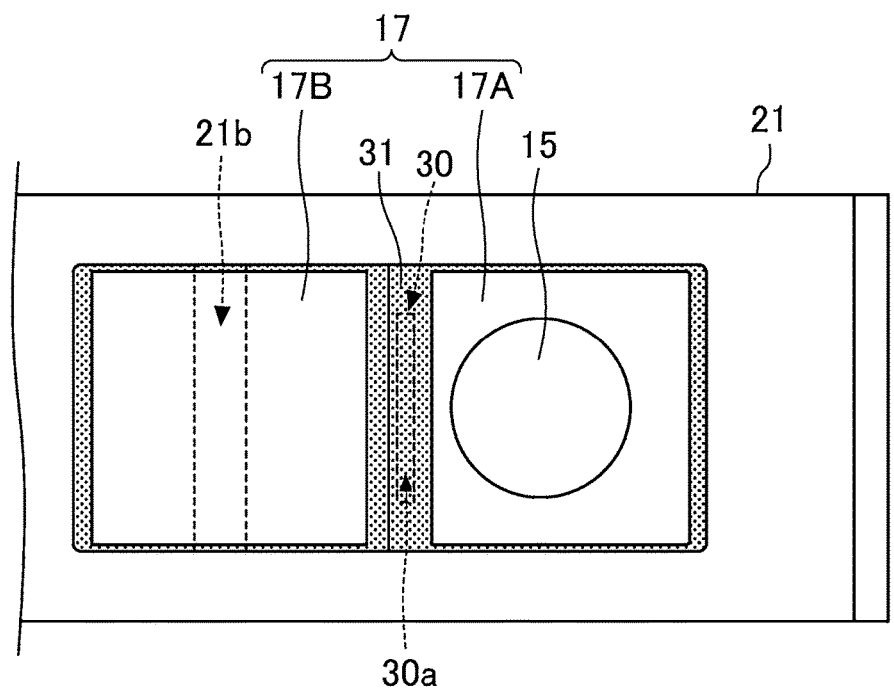
FIG. 2A is an enlarged top view of part of the secondary battery illustrated in FIG. 1A and FIG. 1B near a positive terminal.
Figure 2B:
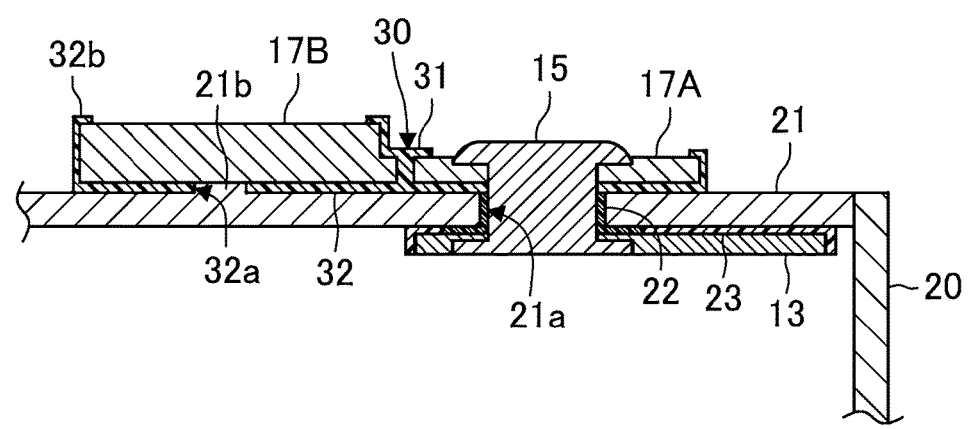
FIG. 2B is an enlarged sectional view of the part of the secondary battery illustrated in FIG. 1A and FIG. 1B near the positive terminal.

FIG. 2A and FIG. 2B are enlarged views of part of the secondary battery 1 illustrated in FIG. 1A and FIG. 1B near the positive terminal 15. FIG. 2A is a top view of the part of the secondary battery 1. FIG. 2B is a sectional view of the part of the secondary battery 1.

As illustrated in FIG. 2A and FIG. 2B, the positive terminal 15 is secured to the sealing body 21 so as to extend through a through-hole 21a formed in the sealing body 21. A gasket 22 disposed on the inner surface of the through-hole 21a seals a space between the positive terminal 15 and the sealing body 21. The positive terminal 15 is connected to the positive-electrode current collector 13 inside the sealing body 21. The positive terminal 15 is connected to the positive-electrode conductive member 17 outside the sealing body 21. The sealing body 21 and the positive-electrode current collector 13 are electrically insulated from each other by using an insulating member 23. The gasket 22 and the insulating member 23 may be a single member. The gasket 22 and the insulating member 23 is preferably made of a resin.

The positive terminal 15 is connected to the positive-electrode current collector 13 by, for example, welding inside the sealing body 21 and connected to the positive-electrode conductive member 17 by crimping outside the sealing body 21. Thus, the positive terminal 15 is secured to the sealing body 21. The positive terminal 15 may be connected to the positive-electrode current collector 13 by crimping inside the sealing body 21. The positive terminal 15 may be connected to the positive-electrode conductive member 17 by welding outside the sealing body 21.

The positive-electrode conductive member 17 includes a fuse 30 formed in part thereof. The positive-electrode conductive member 17 is composed of a plate member and has a first area 17A connected to the positive terminal 15 and a second area 17B extending from the first area 17A toward the side opposite to the positive terminal 15. The second area 17B has a thickness larger than the thickness of the first area 17A. The fuse 30 is formed in the first area 17A and has an electric resistance larger than the electric resistance of the other portion of the positive-electrode conductive member 17. The fuse 30 has a sectional area smaller than the sectional area of the other portion of the positive-electrode conductive member 17. In the embodiment, the fuse 30 is formed in a manner in which a hole 30a extending in the thickness direction of the positive-electrode conductive member 17 is formed in part of the positive-electrode conductive member 17. For example, in the case where a plurality of the secondary batteries 1 are arranged to form an assembled battery, an external conductive member (bus bar) for joining the terminal of each secondary battery 1 to the terminal of another secondary battery 1 is joined to the second area 17B. The thickness of the first area 17A connected to the positive terminal 15 may be equal to the thickness of the second area 17B extending from the first area 17A toward the side opposite to the positive terminal 15. The positive-electrode conductive member 17 is preferably made of a metal and may be made of, for example, aluminum or an aluminum alloy.

The secondary battery 1 according to the embodiment is characterized in that the fuse 30 is disposed outside the exterior body 20 accommodating the electrode body 10 and is covered by a cover 31. In addition, at least an insulating member 32 is disposed between the positive-electrode conductive member 17 including the fuse 30 and the sealing body 21.

When a short circuit occurs in the secondary battery 1 and an excessive short-circuit current flows through the secondary battery 1, the fuse 30 melts, and an electric arc scatters after the fuse 30 melts. Since the fuse 30 is disposed outside the exterior body 20, there is a possibility that the scattering electric arc damages a component, such as a circuit board, disposed near the fuse 30. In the embodiment, however, the fuse 30 is covered by the cover 31, and accordingly, the component can be prevented from being damaged by the scattering electric arc. The cover 31 is preferably a resin member, more preferably an electrically insulating resin member. The cover 31 may be made of a material other than a resin provided that the material is an electrically insulating material. The cover 31 may be made of a material having a very large electric resistance and is preferably made of an electrically insulating material.

In the embodiment, the insulating member 32 is disposed between the positive-electrode conductive member 17 and the sealing body 21. This ensures that the second area 17B and the positive terminal 15 are prevented from being electrically connected to each other with the sealing body 21 interposed therebetween after the short-circuit current flows, the fuse 30 melts, and the second area 17B and the positive terminal 15 are electrically disconnected from each other.

In the embodiment, the fuse 30 is disposed in an area of the positive-electrode conductive member 17 overlapping the sealing body 21 when the positive-electrode conductive member 17 is viewed in the direction perpendicular to the sealing body 21. Accordingly, the sealing body 21 is located below the fuse 30, and scattering of the electric arc is prevented from occurring when the fuse 30 melts. The thickness of a portion of the sealing body 21 facing the fuse 30 is preferably larger than the thickness of a side wall of the exterior body 20. Part of the insulating member 32 or part of the cover 31 is more preferably disposed between the fuse 30 and the sealing body 21.

The fuse 30 according to the embodiment is disposed near the positive terminal 15. Accordingly, there is a possibility that the positive-electrode conductive member 17 bends in its thickness direction when an upper end portion of the positive terminal 15 is crimped on the positive-electrode conductive member 17. In the case where the fuse 30 is formed in a manner in which part of the positive-electrode conductive member 17 is thinned as disclosed in Patent Document 1, there is a possibility that the fuse 30 is damaged when the positive terminal 15 is crimped. For example, there is a possibility that the positive-electrode conductive member 17 is deformed so as to be folded at the part of the positive-electrode conductive member 17 that is thinned.

In the embodiment, however, the fuse 30 is the hole extending through the positive-electrode conductive member 17 in the thickness direction of the positive-electrode conductive member 17. Accordingly, the fuse 30 can be prevented from being damaged even when the upper end portion of the positive terminal 15 is crimped on the positive-electrode conductive member 17.

In the embodiment, the first area 17A is located on one side with respect to the fuse 30 in the longitudinal direction of the sealing body 21, and the second area 17B is located on the other side with respect to the fuse 30. The second area 17B has a thickness larger than the thickness of the first area 17A. Accordingly, the following effects are achieved.

When a component such as an external conductive member (bus bar) is welded to the second area 17B, part of the second area 17B is locally heated. In this case, there is a possibility that the second area 17B is deformed so as to bend due to a variation in the temperature of the second area 17B, and the bend of the second area 17B causes a load to be applied to the fuse 30 so that the fuse 30 is damaged or deformed. In the embodiment, even when a component such as the external conductive member (bus bar) is welded to the second area 17B, the second area 17B can be surely prevented from being deformed so as to bend due to heat generated during welding with certainty in a manner in which the thickness of the second area 17B is increased. This effect can be achieved also in the case where the fuse 30 is not covered by the cover 31. However, in the case where the fuse 30 is covered by the cover 31 and the cover 31 is disposed so as to be in contact with the fuse 30, damage to the fuse 30 can be prevented with great certainty.

The positive terminal 15 is connected to the first area 17A, which is a thin portion of the positive-electrode conductive member 17. This suppresses the deformation of the positive terminal 15 and hence a reduction in sealability near the positive terminal 15 when a load is applied to the positive-electrode conductive member 17 due to, for example, a vibration or an impact.

The thickness of the second area 17B is preferably 1.2 to 5 times the thickness of the first area 17A, more preferably 1.5 to 4 times the thickness of the first area 17A, still more preferably 2 to 4 times the thickness of the first area 17A.

As disclosed in the embodiment, the fuse 30 is preferably formed in an area having a thickness less than the thickness of the second area 17B, for example, an area having the same thickness as the first area 17A. This facilitates the formation of a high electric resistance portion. The first area 17A is located near the positive terminal 15, and accordingly, the fuse 30 can be formed near the positive terminal 15. This enables the fuse 30 to be formed near the position at which the positive terminal 15 is secured to the sealing body 21, making it unlikely to apply a load to the fuse 30 due to, for example, a vibration or an impact. This also decreases a stress applied to the fuse 30 when the positive terminal 15 is crimpled and prevents the fuse 30 from being damaged.

In the embodiment, the insulating member 32 is disposed between the positive-electrode conductive member 17 and the sealing body 21 that face each other. The sealing body 21 includes a protrusion 21b protruding toward the positive-electrode conductive member 17. The insulating member 32 has an insertion hole 32a in which the protrusion 21b is inserted. The protrusion 21b is inserted in the insertion hole 32a of the insulating member 32 and disposed so as to be in contact with the positive-electrode conductive member 17. Thus, the positive-electrode conductive member 17 and the sealing body 21 are electrically connected to each other. In addition to the above structure, the positive-electrode conductive member 17 is connected to the insulating member 32, and accordingly, misalignment of the positive-electrode conductive member 17 can be prevented even when a force is applied to the positive-electrode conductive member 17 so as to cause the positive-electrode conductive member 17 to rotate with respect to the sealing body 21.

The positive-electrode conductive member 17 is not necessarily in direct contact with the sealing body 21 and may be electrically connected to the sealing body 21 with another conductive member interposed therebetween. A protrusion may be formed on the lower surface of the positive-electrode conductive member 17 so as to be in contact with the sealing body 21.

In the embodiment, the insulating member 32 includes an extension 32b extending to a position higher than the upper surface of the second area 17B of the positive-electrode conductive member 17. This enables the position of the external conductive member (bus bar) to be readily set on the basis of the extension 32b when the external conductive member (bus bar) is welded to the second area 17B.

In the embodiment, as illustrated in FIG. 2B, the upper end portion of the positive terminal 15 is located below the upper surface of the second area 17B of the positive-electrode conductive member 17. This ensures prevention of damage to a component near the positive terminal 15 due to contact of the positive terminal 15 with another component manufacturing apparatus and prevention of a reduction in sealability near the positive terminal 15 when the external conductive member (bus bar), for example, is connected to the second area 17B of the positive-electrode conductive member 17.

In the embodiment, as illustrated in FIG. 2B, a recess is formed on the positive-electrode conductive member 17 around the through-hole 21a. The positive terminal 15 is crimped into the recess. This is preferable because the upper end portion of the positive terminal 15 can be lowered. The crimped portion of the positive terminal 15 and the positive-electrode conductive member 17 are preferably welded by, for example, laser welding along the edge of the recess around the through-hole 21a.

In the embodiment, as illustrated in FIG. 2B, the insulating member 32 includes a stationary portion secured to the positive-electrode conductive member 17. This enables the insulating member 32 and the positive-electrode conductive member 17 to be secured with certainty and prevents the insulating member 32 from being damaged due to a load such as a vibration or an impact. The stationary portion is disposed so as to be in contact with the side surfaces and upper surface of the positive-electrode conductive member 17. The stationary portion may be formed in a pawl shape and may engage the positive-electrode conductive member 17. A thin portion may be formed on the positive-electrode conductive member 17 along the edge portion of the second area 17B, and the stationary portion of the insulating member 32 may engage the thin portion formed along the edge portion of the second area 17B.

In the embodiment, the protrusion 21b of the sealing body 21 is in contact with the positive-electrode conductive member 17. The area of contact between the protrusion 21b of the sealing body 21 and the positive-electrode conductive member 17 is adjusted. When a short-circuit current flows, the joint between the protrusion 21b of the sealing body 21 and the positive-electrode conductive member 17 preferably melts. It is preferable that the protrusion 21b of the sealing body 21 and the positive-electrode conductive member 17 melt and be connected to each other after the fuse 30 melts and a bypass be formed with certainty.

The sealing body 21 includes the protrusion 21b protruding toward the positive-electrode conductive member 17. The insulating member 32 has the insertion hole 32a in which the protrusion 21b is inserted. The protrusion 21b is inserted in the insertion hole 32a of the insulating member 32 and disposed so as to be in contact with the positive-electrode conductive member 17. Thus, the insulating member 32 and the positive-electrode conductive member 17 secured to the insulating member 32 are secured to the sealing body 21 along a surface of the sealing body 21 and are accordingly prevented from rotating. As illustrated in FIG. 2B, in the positive-electrode conductive member 17, the distance between the joint of the positive-electrode conductive member 17 to the sealing body 21 and the fuse 30 is preferably larger than the distance between the fuse 30 in the positive-electrode conductive member 17 and a through-hole 17a.

As illustrated in FIG. 2B, the lower surface of the first area 17A of the positive-electrode conductive member 17 is preferably coplanar with the lower surface of the second area 17B of the positive-electrode conductive member 17. This enables the first area 17A of the positive-electrode conductive member 17 and the second area 17B of the positive-electrode conductive member 17 to be supported on the coplanar lower surface and enables a load applied to the fuse 30 to be suppressed.

As disclosed in the embodiment, the cover is preferably disposed so as to be in contact with the fuse 30. This enables the fuse 30 to be reinforced with certainty.

The fuse 30 is preferably formed at a position of 40% to 60% of the length of the positive-electrode conductive member 17 in the longitudinal direction of the sealing body 21 away from the end portion of the positive-electrode conductive member 17 near the center of the sealing body 21 in the longitudinal direction of the sealing body 21. This enables the positive terminal 15 and the external conductive member (bus bar) to be connected to the positive-electrode conductive member 17 so as to be balanced.

The second area 17B of the positive-electrode conductive member 17 is preferably made of the same material throughout the thickness direction. In particular, the second area 17B of the positive-electrode conductive member 17 is preferably made of aluminum or an aluminum alloy throughout the thickness direction.

A portion of the external conductive member (bus bar) that is connected to the second area 17B of the positive-electrode conductive member 17 and the second area 17B of the positive-electrode conductive member 17 in contact with the sealing body 21 are preferably made of aluminum or an aluminum alloy. This improves the state of connection between the components and accordingly enables a reduction in the electric resistance between the external conductive member (bus bar), the second area 17B of the positive-electrode conductive member 17, and the sealing body 21 after the fuse 30 melts.

A projection may be formed on the upper surface of the second area 17B of the positive-electrode conductive member 17. This enables the position of the external conductive member (bus bar) to be readily set on the basis of the protrusion formed on the upper surface of the second area 17B when the external conductive member (bus bar) is welded to the second area 17B. The external conductive member (bus bar) may has an opening or a notch, and the protrusion formed on the upper surface of the second area 17B may be inserted in the opening or the notch.

In the present invention, the cover 31 and the insulating member 32 may be composed of the same material. In this case, the positive-electrode conductive member 17, the cover 31, and the insulating member 32 are preferably formed integrally with each other. The positive-electrode conductive member 17, the cover 31, and the insulating member 32 can be formed integrally with each other by using, for example, insertion molding.

A method of forming the positive-electrode conductive member 17, the cover 31, and the insulating member 32 by using insertion molding will be described with reference to FIG. 3A, FIG. 3B, and FIG. 4.

Figure 3A:
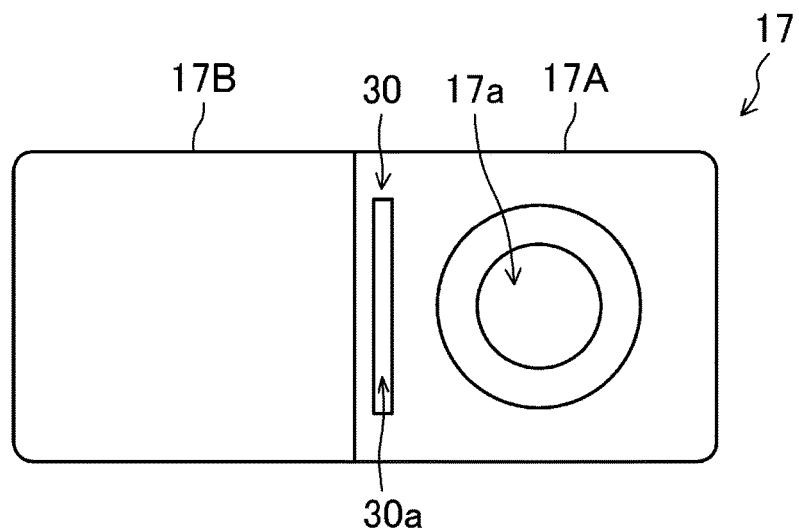
FIG. 3A is a top view of a positive-electrode conductive member processed and illustrates a method of forming the positive-electrode conductive member, a cover, and an insulating member by using insertion molding.
Figure 3B:
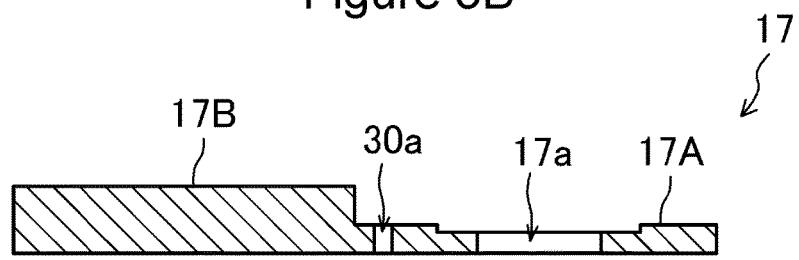
FIG. 3B is a sectional view of the positive-electrode conductive member and illustrates the method of forming the positive-electrode conductive member, the cover, and the insulating member by using insertion molding.
Figure 4:
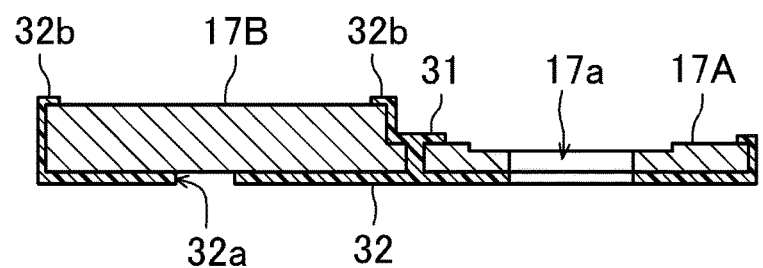
FIG. 4 illustrates the method of forming the positive-electrode conductive member, the cover, and the insulating member by using insertion molding.

The positive-electrode conductive member 17 is processed into a shape illustrated in FIG. 3A and FIG. 3B. FIG. 3A is a top view of the positive-electrode conductive member 17 processed. FIG. 3B is a sectional view of the positive-electrode conductive member 17. As illustrated in FIG. 3A and FIG. 3B, the first area 17A connected to the positive terminal 15 and the second area 17B extending from the first area 17A toward the side opposite to the positive terminal 15 are formed in a manner in which a pressing process is performed on the positive-electrode conductive member 17 in a plate shape. At this time, the pressing process is performed such that the thickness of the second area 17B is larger than the thickness of the first area 17A. The hole 30a, which defines the fuse 30, and the through-hole 17a, through which the positive terminal 15 is to extend, are formed in the first area 17A.

The positive-electrode conductive member 17 is subsequently fitted into a mold (not illustrated) having a predetermined shape. Then, a molten resin is injected into a space in the mold, and as illustrated in FIG. 4, the positive-electrode conductive member 17, the cover 31, and the insulating member 32 are thereby insertion-molded.

In the case where the positive-electrode conductive member 17, the cover 31, and the insulating member 32 are thus formed integrally with each other by using insertion molding, the strength of the fuse 30 can be increased. This prevents the fuse 30 from being damaged even when a load is applied to the positive-electrode conductive member 17.

There is a possibility that a load is applied to the fuse 30, for example, when the secondary battery 1 is subjected to a strong impact or vibration. In the case where the secondary battery 1 expands in its thickness direction, there is a possibility that the direction in which a load is applied to a portion of the positive-electrode conductive member 17 that is connected to the external conductive member (bus bar) and the direction in which a load is applied to a portion of the positive terminal 15 that is connected to the external conductive member (bus bar) are opposite to each other with respect to the horizontal direction. In this case, a load is applied to the fuse 30.

In the case where the positive terminal 15 is connected to the positive-electrode conductive member 17 by crimping, the fuse 30 can be prevented from being damaged during crimping of the positive terminal 15. A process of assembling the secondary battery 1 can be simplified in a manner in which the positive-electrode conductive member 17, the cover 31, the insulating member 32 are formed integrally with each other as a single component.

Figure 5:
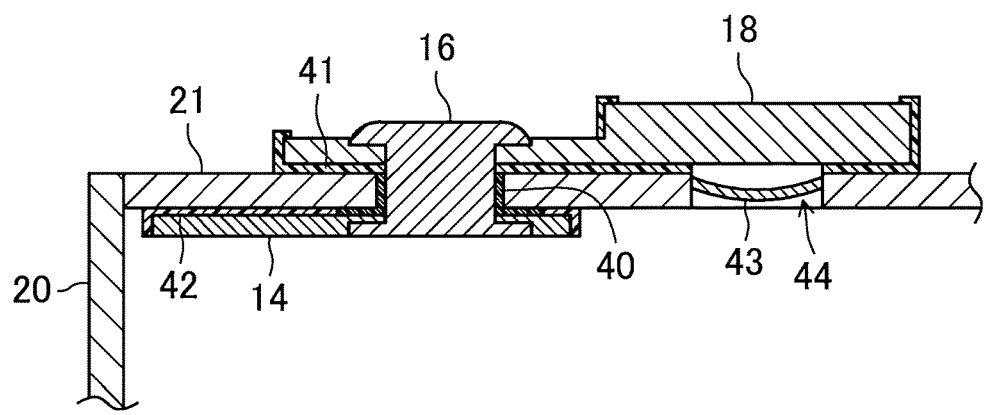
FIG. 5 is an enlarged sectional view of part of the secondary battery illustrated in FIG. 1A and FIG. 1B near a negative terminal.

FIG. 5 is an enlarged sectional view of part of the secondary battery 1 illustrated in FIG. 1A and FIG. 1B near the negative terminal 16. The structure near the negative terminal 16 differs from the structure near the positive terminal 15 in that a shorting mechanism is formed instead of the fuse.

As illustrated in FIG. 5, the negative terminal 16 extends through the through-hole formed in the sealing body 21 and is secured to the sealing body 21. A gasket 40 seals a space between the negative terminal 16 and the sealing body 21. The negative terminal 16 is connected to the negative-electrode current collector 14 inside the sealing body 21. The negative terminal 16 is connected to the negative-electrode conductive member 18 outside the sealing body 21. The sealing body 21 and the negative-electrode conductive member 18 are electrically insulated from each other by using an insulating member 41. The sealing body 21 and the negative-electrode current collector 14 are electrically insulated from each other by using an insulating member 42.

The negative-electrode conductive member 18 is preferably made of copper or a copper alloy. The negative-electrode conductive member 18 may include a portion made of copper or a copper alloy and a portion made of aluminum or an aluminum alloy. In this case, the negative terminal 16 may be connected to the portion of the negative-electrode conductive member 18 that is made of copper or a copper alloy, and an external conductive member (bus bar) made of aluminum or an aluminum alloy may be connected to the portion of the negative-electrode conductive member 18 that is made of aluminum or an aluminum. The negative-electrode conductive member 18 may be made of aluminum or an aluminum alloy. In this case, a portion of the negative terminal 16 that is connected to the negative-electrode conductive member 18 may be made of aluminum or an aluminum alloy.

As illustrated in FIG. 5, a hollow 44 is formed in part of the sealing body 21, and an inverted plate 43 as a deformable member is disposed therein so as to cover the hollow 44. This portion may be formed in a manner in which a through-hole for the shorting mechanism is formed in the sealing body 21, the inverted plate 43 is connected to the sealing body 21, and the through-hole for the shorting mechanism is sealed by the inverted plate 43. Alternatively, the inverted plate 43 as a deformable member may be formed in a manner in which a pressing process is performed on the sealing body 21.

As illustrated in FIG. 2A, since the protrusion 21b of the sealing body 21 is electrically connected to the positive-electrode conductive member 17, the inverted plate 43 has the same polarity as the sealing body 21. Accordingly, when the secondary battery 1 is excessively charged, and the pressure in the exterior body 20 is equal to or more than a predetermined value, the inverted plate 43 is inverted and comes in contact with the negative-electrode conductive member 18. In this way, the inverted plate 43 acts as the shorting mechanism that causes an electrical short circuit between the positive-electrode sheet and the negative-electrode sheet outside the electrode body.

The shape of the deformable member is not limited to the shape of the inverted plate 43 provided that the deformable member deforms and is electrically connected to the negative-electrode conductive member 18 when the pressure in the exterior body 20 is equal to or more than a predetermined value. The deformable member is preferably made of a metal and is preferably made of the same metal as the sealing body 21.

When the shorting mechanism operates, a short-circuit current flows through the sealing body 21 as a current path between the positive terminal 15 and the negative terminal 16. Consequently, the fuse 30 formed in the positive-electrode conductive member 17 melts due to the short-circuit current, and accordingly, the excessive charge into the secondary battery 1 can be prevented from progressing.

Although the present invention is described above with the preferred embodiment, the description is not a limitation, and of course, various modifications can be made.

Figure 6A:
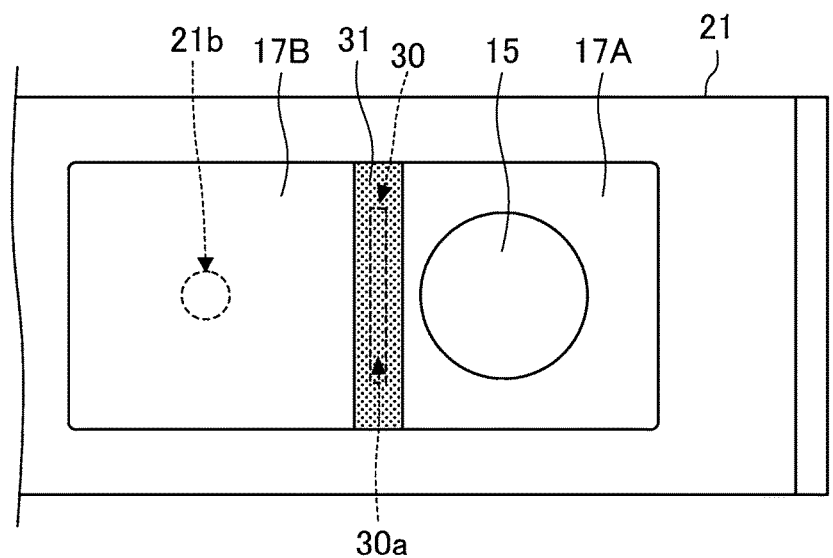
FIG. 6A is an enlarged top view of part of a secondary battery according to another embodiment of the present invention near a positive terminal.
Figure 6B:
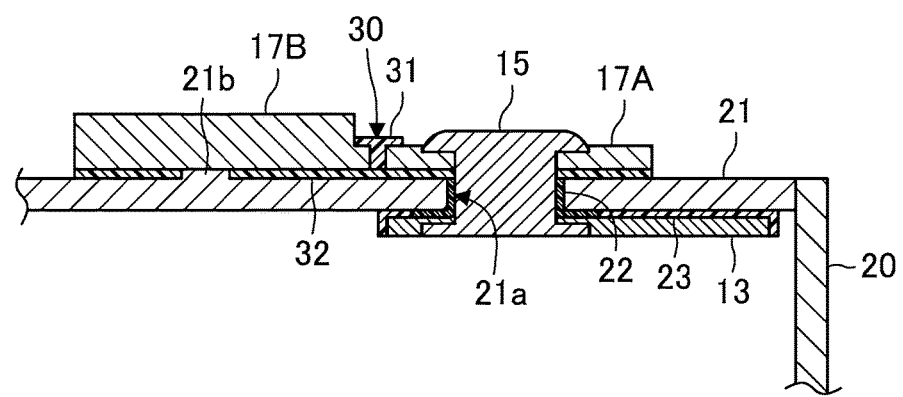
FIG. 6B is an enlarged sectional view of the part of the secondary battery illustrated in FIG. 6A near the positive terminal.

For example, although the cover 31 and the insulating member 32 are formed of the same material integrally with each other in the embodiment, as illustrated in FIG. 6A and FIG. 6B, the cover 31 and the insulating member 32 may be formed of different materials. In this case, the cover 31 is formed so as to cover the fuse 30. The cover 31 may be formed by, for example, application of a molten resin. Alternatively, the cover 31 may be fitted into and secured to the fuse 30. Alternatively, the cover 31 may be made of a resin member and may be attached by using, for example, an adhesive. Alternatively, an electrically insulating tape may be attached to the outer surface of the fuse 30. In the present invention, the material of the cover 31 and the insulating member 32 is not particularly limited. Although the protrusion 21b is formed in a belt-like shape parallel to the width direction of the second area 17B of the positive-electrode conductive member 17 in FIG. 2A, as illustrated in FIG. 6A, the protrusion 21b may be formed in a cylindrical shape.

The cover 31 may include an extension extending to a position higher than the upper surface of the second area 17B of the positive-electrode conductive member 17. The position of the external conductive member (bus bar) can be readily set on the basis of the extension of the cover 31 when the external conductive member (bus bar) is welded to the second area 17B.

The cover 31 is preferably made of a resin material. For example, PFA (tetrafluoroethylene-perfluoroalkyl vinyl ether copolymer), PPS (polyphenylenesulfide), PC (polycarbonate) can be used. In particular, the cover 31 is preferably made of a resin material having heat resistance. Preferred examples of the resin material having heat resistance include PFA (tetrafluoroethylene-perfluoroalkyl vinyl ether copolymer) and PPS (polyphenylenesulfide).

The insulating member 32 is preferably made of an electrically insulating resin material. For example, PFA, PPS, and PC (polycarbonate) are preferably used.

Figure 7:
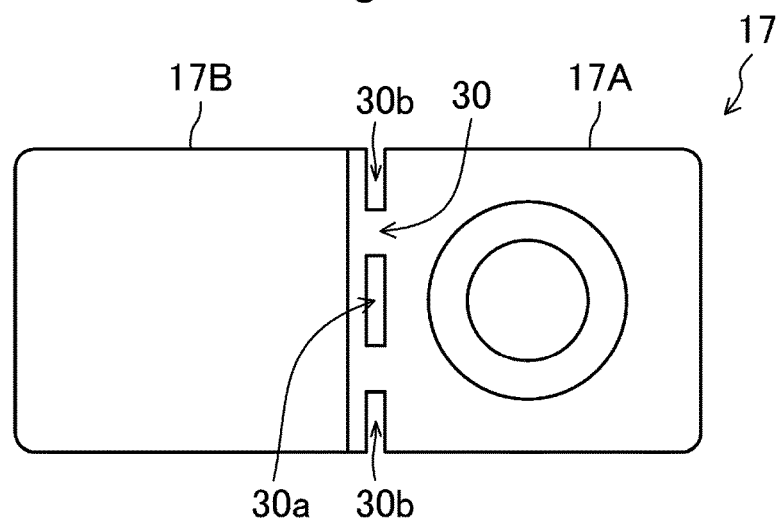
FIG. 7 is a top view of a fuse according to another embodiment of the present invention.

In the embodiment, the fuse 30 is formed in a manner in which the hole 30a extending in the thickness direction of the positive-electrode conductive member 17 is formed in part of the positive-electrode conductive member 17. However, this is not a limitation. Provided that part of the positive-electrode conductive member 17 has a sectional area smaller than the sectional area of the other part of the positive-electrode conductive member 17, the structure thereof is not particularly limited. For example, as illustrated in FIG. 7, the fuse 30 may be formed in a manner in which the hole 30a extending in the thickness direction of the positive-electrode conductive member 17 is formed in part of the positive-electrode conductive member 17, and slits 30b are formed in the positive-electrode conductive member 17 on both sides of the hole 30a in the width direction of the positive-electrode conductive member 17.

In the embodiment, the inverted plate 43 is the shorting mechanism. However, the shorting mechanism is not limited thereto provided that the shorting mechanism operates to cause an electrical short circuit between the positive-electrode sheet and the negative-electrode sheet when the pressure in the exterior body 20 is equal to or more than a predetermined value. For example, the shorting mechanism may be a mechanism that achieves the following: when the secondary battery 1 is in a normal operation, the sealing body 21 is not electrically connected to the positive electrode nor the negative electrode, and, when the pressure in the exterior body 20 is equal to or more than a predetermined value, the positive electrode is electrically connected to the sealing body 21, and the negative electrode is electrically connected to the sealing body 21. Alternatively, the shorting mechanism may be a mechanism that achieves the following: when the pressure in the exterior body 20 is equal to or more than a predetermined value, the positive electrode and the negative electrode are electrically connected to each other directly without the intervention of the sealing body 21.

Figure 8:
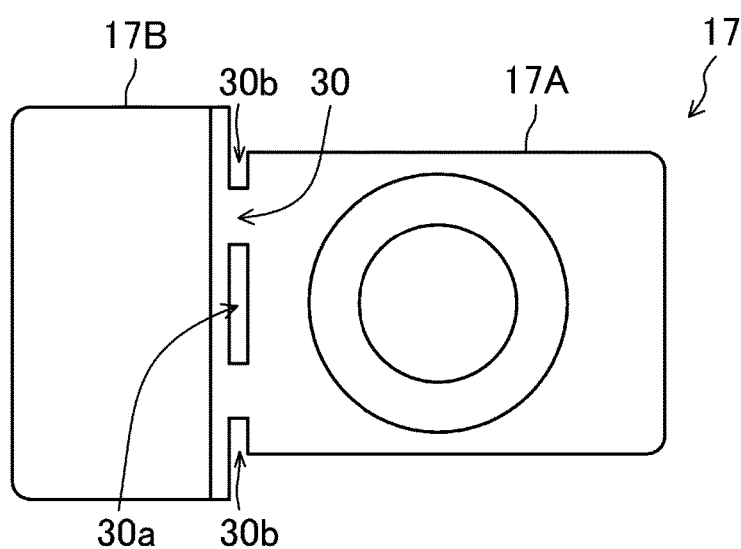
FIG. 8 is a top view of a positive-electrode conductive member according to another embodiment of the present invention.

In the embodiment, the first area 17A and second area 17B of the positive-electrode conductive member 17 have the same width. However, as illustrated in FIG. 8, the second area 17B may have a width larger than the width of the first area 17A. The width of the first area 17A and the width of the second area 17B means the widths in the transverse direction of the sealing body 21. This structure enables an increase in the size of the connecting surface or joint between the second area 17B and a bus bar (external conductive member) while not increasing the length of the second area 17B in the longitudinal direction of the sealing body 21. This structure is particularly effective in the case where the positive terminal 15 and the negative terminal 16 are disposed on the surface of a prismatic battery case that has the minimum area.

In the embodiment, the first area 17A of the positive-electrode conductive member 17 is located nearer than the second area 17B to the outside in the longitudinal direction of the sealing body 21. However, the first area 17A of the positive-electrode conductive member 17 may be located nearer than the second area 17B to the center in the longitudinal direction of the sealing body 21. This structure prevents the exhaust valve 25 from being damaged by molten metallic particles (spatters) scattering on the exhaust valve 25 formed at the center of the sealing body 21 in the case where the bus bar (external conductive member) is welded to the second area 17B. This structure is particularly effective in the case where the positive terminal 15 and the negative terminal 16 are disposed on the surface of a prismatic battery case that has the minimum area.

In the case where the positive terminal 15 and the negative terminal 16 are disposed on the surface of a prismatic battery case that has the minimum area, the sealing member 24 for sealing the solution injecting hole preferably seals the solution injecting hole in a manner in which the sealing member itself is deformed without using welding etc., as in the case of, for example, a blind rivet.

In the case where the positive terminal 15 and the negative terminal 16 are disposed on the surface of a prismatic battery case that has the minimum area, the distance between the solution injecting hole and the insulating member 32 decreases. Accordingly, there is a possibility that the insulating member 32 is damaged by heat generated during welding in the case where the sealing member 24 is welded to the sealing body 21 by using, for example, laser welding to seal the solution injecting hole. For this reason, the sealing member 24 preferably seals the solution injecting hole in a manner in which the sealing member itself is deformed without using welding etc., as in the case of, for example, a blind rivet.

In the embodiment, the fuse 30 is formed in part of the positive-electrode conductive member 17. However, the fuse 30 may be formed in part of the negative-electrode conductive member 18.

The type of the secondary battery 1 according to the embodiment of the present invention is not particularly limited. The structure of the electrode body 10 is not particularly limited. The electrode body 10 may be a wound electrode body obtained by winding an elongated positive-electrode sheet and an elongated negative-electrode sheet with a separator interposed therebetween. The electrode body 10 may be a stack-type electrode body obtained by stacking plural positive-electrode sheets and plural negative-electrode sheets with separators interposed therebetween.

The present invention is particularly effective for a non-aqueous electrolyte secondary battery. Known materials may be used for the positive electrode, the negative electrode, the separator, the electrolytic solution, and so on. It is particularly preferable that a material that produces a gas, such as lithium carbonate or cyclohexylbenzene, when the secondary battery 1 is excessively charged be added to the positive electrode or the electrolytic solution.

Figure 9:
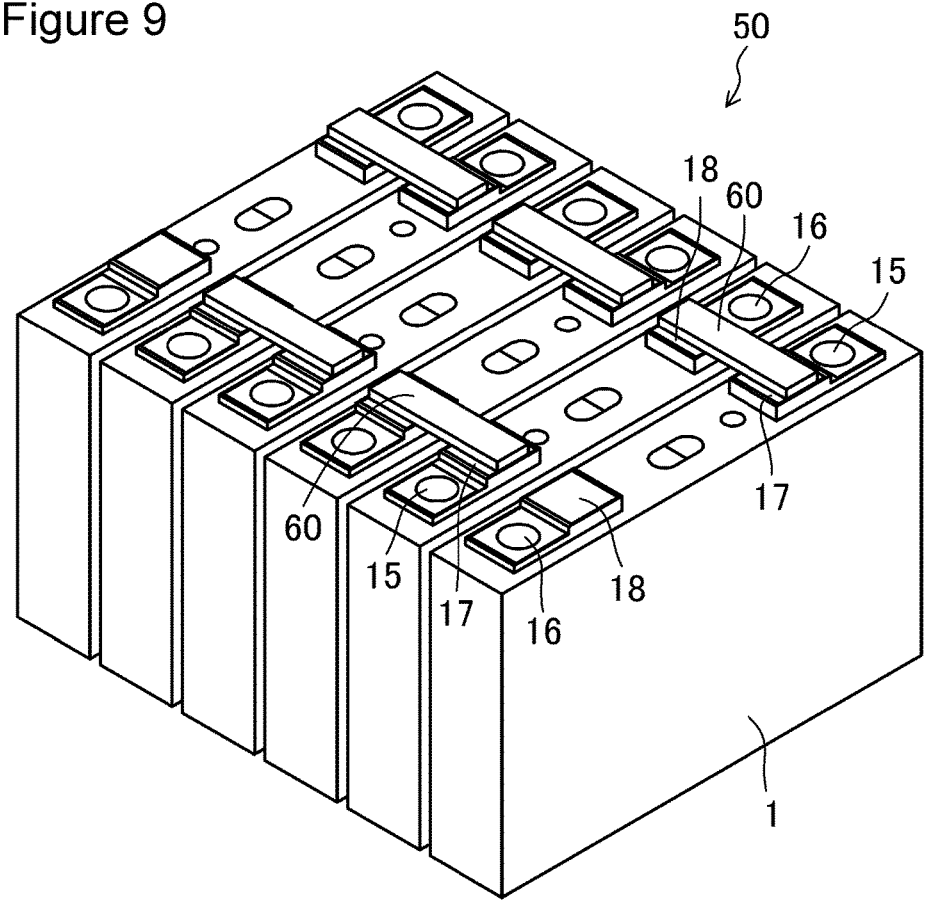
FIG. 9 is a perspective view of an assembled battery according to another embodiment of the present invention.
Figure 10:
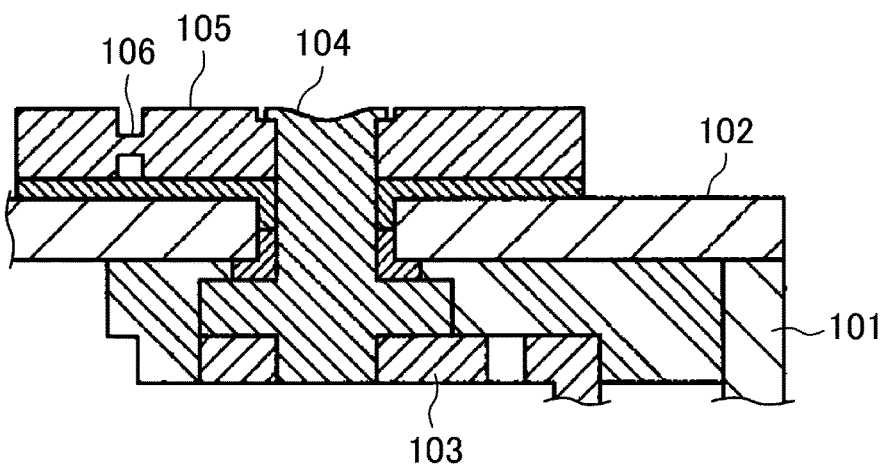
FIG. 10 is an enlarged sectional view of part of a conventional secondary battery including a fuse.

A plurality of the secondary batteries 1 according to the embodiment of the present invention can be arranged to form an assembled battery. FIG. 9 is a perspective view of an assembled battery 50 illustrating an example in which six secondary batteries 1 according to the embodiment of the present invention are arranged to form the assembled battery 50. As illustrated in FIG. 9, the six secondary batteries 1 are electrically connected to each other in series such that the positive terminal 15 and negative terminal 16 of each secondary battery 1 are arranged so as to alternate, the positive terminal 15 of each secondary battery 1 is joined to the negative terminal 16 of the adjoining secondary battery 1 by using a bus bar 60 (external conductive member). Of course, the six secondary batteries 1 may be electrically connected to each other in parallel.

The present invention is particularly effective in the case where, in the assembled battery 50, a circuit board is disposed above the surface on which the positive terminal 15 and the negative terminal 16, for example, are disposed.

The width of a portion of the bus bar 60 (external conductive member) that is disposed on the positive-electrode conductive member 17 in the longitudinal direction of the sealing body 21 is preferably smaller than the length of the second area 17B of the positive-electrode conductive member 17 in the longitudinal direction of the sealing body 21.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body including a positive-electrode sheet and a negative-electrode sheet;
an exterior body having an opening and accommodating the electrode body;
a sealing body sealing the opening;
a terminal electrically connected to the positive-electrode sheet or the negative-electrode sheet and extending through a through-hole formed in the sealing body; and
a conductive member connected to the terminal outside the sealing body,
wherein the conductive member includes a fuse,
wherein the fuse is covered by a cover,
wherein an insulating member is disposed between the conductive member and the sealing body,
the conductive member is electrically connected to the sealing body,
the conductive member includes a first area and a second area that are disposed on opposite sides of the fuse,
the first area is connected to the terminal,
the first area defines a first surface on a side facing away from the sealing body,
the second area defines a second surface on a side facing away from the sealing body, and
the sealing body is closer to the first surface than to the second surface in a direction of thickness of the sealing body.

2. The secondary battery according to claim 1,
wherein the terminal is a positive terminal electrically connected to the positive-electrode sheet or a negative terminal electrically connected to the negative-electrode sheet,
wherein the positive terminal and the negative terminal are attached to the sealing body, and
wherein the fuse is disposed in an area of the conductive member overlapping the sealing body when the conductive member is viewed in a direction perpendicular to the sealing body.

3. The secondary battery according to claim 1,
wherein the cover is a resin member.

4. The secondary battery according to claim 3,
wherein the conductive member, the resin member, and the insulating member are formed integrally with each other.

5. The secondary battery according to claim 1,
wherein a hole extending in a thickness direction of the conductive member is formed in the conductive member at the fuse.

6. The secondary battery according to claim 5,
wherein the insulating member includes an extension extending from a portion thereof between the conductive member and the sealing body to a position higher than an upper surface of the second area of the conductive member.

7. The secondary battery according to claim 1,
wherein the second area has a thickness larger than the thickness of the first area, and
wherein the first area of the conductive member is connected to the terminal.

8. The secondary battery according to claim 7, wherein the second area is to be joined to an external conductive member.

9. The secondary battery according to claim 1,
wherein the insulating member is disposed between the conductive member and the sealing body that face each other,
wherein the sealing body includes a protrusion protruding toward the conductive member,
wherein the insulating member has an insertion hole, and
wherein the protrusion is inserted in the insertion hole of the insulating member and electronically connected to the conductive member.

10. An assembled battery comprising:
plurality of the secondary batteries according to claim 1.

11. The secondary battery according to claim 1, wherein the terminal comprises a positive terminal, and the conductive member is electrically connected to the positive-electrode sheet; and
the secondary battery further includes:
a negative terminal electrically connected to the negative-electrode sheet,
a negative-electrode conductive member connected to the negative terminal outside the sealing body,
the sealing body including an inversion plate,
the negative-electrode conductive member facing the inversion plate, and
the negative-electrode conductive member is electrically connected to the inversion plate where a pressure inside the exterior body is equal to or more than a predetermined value.

12. A secondary battery comprising:
an electrode body including a positive-electrode sheet and a negative-electrode sheet;
an exterior body having an opening and accommodating the electrode body;
a sealing body sealing the opening;
a terminal electrically connected to the positive-electrode sheet or the negative-electrode sheet and extending through a through-hole formed in the sealing body; and
a conductive member connected to the terminal outside the sealing body,
wherein the conductive member includes a fuse,
wherein the fuse is covered by a cover,
wherein an insulating member is disposed between the conductive member and the sealing body,
the conductive member includes a first area and a second area that are disposed on opposite sides of the fuse,
the first area is connected to the terminal,
the second area is to be joined to an external conductive member,
the second area is electrically connected to the sealing body;
wherein the external conductive member comprises a bus bar that electrically connects the secondary batteries located adjacent to each other, and
wherein the bus bar is connected to the second area and is free of direct contact to the terminal.

13. The secondary battery according to claim 12, wherein the terminal comprises a positive terminal, and the conductive member is electrically connected to the positive-electrode sheet; and
the secondary battery further includes:
a negative terminal electrically connected to the negative-electrode sheet;
a negative-electrode conductive member connected to the negative terminal outside the sealing body,
the sealing body including an inversion plate,
the negative-electrode conductive member facing the inversion plate, and the negative-electrode conductive member is electrically connected to the inversion plate where a pressure inside the exterior body is equal to or more than a predetermined value.

14. The secondary battery according to claim 12, further including:
   a hole formed in the conductive member at the fuse and extending in a thickness direction of the conductive member,
   wherein the cover includes a first portion disposed in the hole, and a second portion and a third portion extending from opposite ends of the first portion,
   the first portion is disposed on an upper side of the conductive member facing away from the sealing body, a length of the first portion is greater than the hole in a longitudinal direction of the sealing body, and
   the second portion is disposed on a lower side of the conductive member facing toward the sealing body, a length of the second portion is greater than the hole in the longitudinal direction of the sealing body.

15. The secondary battery according to claim 12, wherein the second area directly contacts the sealing body.

16. A secondary battery comprising:
   an electrode body including a positive-electrode sheet and a negative-electrode sheet;
   an exterior body having an opening and accommodating the electrode body;
   a sealing body sealing the opening;
   a terminal electrically connected to the positive-electrode sheet or the negative-electrode sheet and extending through a through-hole formed in the sealing body; and
   a conductive member connected to the terminal outside the sealing body,
   wherein the conductive member includes a fuse,
   wherein the fuse is covered by a cover,
   wherein an insulating member is disposed between the conductive member and the sealing body,
   the conductive member includes a first area and a second area that are disposed on opposite sides of the fuse,
   the first area is connected to the terminal,
   an insulating member is disposed between the second area and the sealing body,
   the insulating member contacts the sealing body, and
   the conductive member is electrically connected to the sealing body.

17. The secondary battery according to claim 16, wherein the insulating member includes an opening defined therein, and the sealing body includes a protrusion disposed in the opening,
   the protrusion extending through the opening to contact the second area.

18. The secondary battery according to claim 17, wherein the terminal comprises a positive terminal, and the conductive member is electrically connected to the positive-electrode sheet, and
   the secondary battery further includes:
      a negative terminal electrically connected to the negative-electrode sheet; and
      a negative-electrode conductive member connected to the negative terminal outside the sealing body,
      the sealing body including an inversion plate, and
      the negative-electrode conductive member facing the inversion plate,
      the negative-electrode conductive member is electrically connected to the inversion plate where a pressure inside the exterior body is equal to or more than a predetermined value.

* * * * *